(12) United States Patent
Hufker et al.

(10) Patent No.: US 11,012,430 B1
(45) Date of Patent: May 18, 2021

(54) USER EQUIPMENT RELAY MEDIATED NETWORK CHANNELS WITH BLOCKCHAIN LOGGING

(71) Applicant: T-MOBILE INNOVATIONS LLC, Overland Park, KS (US)

(72) Inventors: David Hufker, Shawnee, KS (US); Lyle W. Paczkowski, Mission Hills, KS (US); George Jason Schnellbacher, Overland Park, KS (US); Michael David Svoren, Jr., Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/673,919

(22) Filed: Nov. 4, 2019

(51) Int. Cl.
| | |
|---|---|
| *H04M 3/16* | (2006.01) |
| *H04L 29/06* | (2006.01) |
| *H04L 9/32* | (2006.01) |
| *H04L 9/06* | (2006.01) |
| *G06F 21/62* | (2013.01) |
| *H04W 88/04* | (2009.01) |
| *G06Q 20/32* | (2012.01) |
| *H04W 12/033* | (2021.01) |

(52) U.S. Cl.
CPC ...... *H04L 63/0492* (2013.01); *G06F 21/6245* (2013.01); *G06Q 20/3278* (2013.01); *H04L 9/0637* (2013.01); *H04L 9/3242* (2013.01); *H04W 12/033* (2021.01); *H04W 88/04* (2013.01); *H04L 2209/38* (2013.01); *H04L 2209/56* (2013.01)

(58) Field of Classification Search
CPC . H04L 63/0492; H04L 9/0637; H04L 9/3242; H04L 2209/38; H04L 2209/56; H04W 12/0013; H04W 88/04; G06F 21/6245; G06Q 20/3278
USPC ................. 455/411, 11, 1, 550.1; 726/25
See application file for complete search history.

(56) References Cited

U.S. PATENT DOCUMENTS

| | | | |
|---|---|---|---|
| 9,282,898 B2 | 3/2016 | McRoberts et al. | |
| 10,225,289 B1* | 3/2019 | Tucker, IV | ........... H04W 4/029 |
| 2010/0020974 A1* | 1/2010 | Tsai | .................. H04W 12/0013 380/270 |
| 2010/0260126 A1* | 10/2010 | Ulupinar | ............... H04W 92/20 370/329 |
| 2012/0182939 A1* | 7/2012 | Rajan | .................. G06F 19/3418 370/328 |
| 2013/0083722 A1* | 4/2013 | Bhargava | .......... H04W 52/0209 370/315 |
| 2015/0271672 A1* | 9/2015 | Ding | ..................... H04W 12/06 713/153 |
| 2016/0099963 A1* | 4/2016 | Mahaffey | ............ H04L 63/0227 726/25 |
| 2016/0212708 A1* | 7/2016 | Kim | .................. H04W 52/0229 |

(Continued)

*Primary Examiner* — Danh C Le

(57) ABSTRACT

A mechanism of mediating an encrypted communication channel via a user equipment (UE) relay is described. This includes receiving an indication of a sensitive transaction from an application operating on a UE. The UE relay establishes a downstream encrypted communication channel to the application via a communication port at the UE. The UE relay then receives an end point for the sensitive transaction from the application over the downstream encrypted communication channel. The UE relay can then create an upstream encrypted communication channel to the end point.

18 Claims, 9 Drawing Sheets

(56) References Cited

U.S. PATENT DOCUMENTS

2016/0337797 A1* 11/2016 Choi ............... H04W 4/023
2016/0366115 A1* 12/2016 Khalid ............. H04L 9/0819
2017/0359423 A1* 12/2017 Nadathur ......... G07C 9/00309
2018/0020442 A1*  1/2018 Nair ............... H04L 5/003
2018/0172664 A1*  6/2018 Love ............... A61B 5/14532
2018/0295556 A1* 10/2018 Baek ............... H04L 63/306
2018/0343600 A1* 11/2018 Ma ................. H04W 12/001
2019/0313248 A1* 10/2019 Middelesch ...... H04W 12/0401

* cited by examiner

USER EQUIPMENT RELAY MEDIATED NETWORK CHANNELS WITH BLOCKCHAIN LOGGING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users employ a wide range of devices when communicating across the Internet. Such devices may include complex devices such as smart phones and simple devices. For example, smart phones span from multiple wireless communication interfaces to more advanced processing capabilities while simple devices with Internet communication capability may include a single wireless interface and simplistic processing capabilities. Fifth generation cellular network technology (5G) contemplates providing secure communication mechanisms for an extensive array of such devices. Providing sufficient wireless coverage for such devices creates an initial level of difficulty. Further, providing security to prevent malicious access to networks via the devices with simplistic processing capabilities creates additional challenges.

SUMMARY

In an embodiment, a method of mediating an encrypted communication channel via a user equipment (UE) relay is disclosed. The method comprises receiving, at a UE relay, an indication of a sensitive transaction from an application operating on a UE. The method further comprises establishing, by the UE relay, a downstream encrypted communication channel to the application via a communication port at the UE. The method further comprises receiving, by the UE relay, an end point for the sensitive transaction from the application over the downstream encrypted communication channel. The method further comprises creating, by the UE relay, an upstream encrypted communication channel to the end point.

In another embodiment, a method of mediating an encrypted communication channel via a UE relay is disclosed. The method comprises receiving, at a UE relay, an indication of a sensitive transaction from an application operating on a UE. The method further comprises generating, at the UE relay, a genesis block of a blockchain for recording the sensitive transaction. The method further comprises transmitting, by the UE relay, the genesis block to the application. The method further comprises receiving, at the UE relay, a blockchain from the application at the UE, wherein the blockchain includes the genesis block and one or more life blocks indicating the application and an end point for the sensitive transaction. The method further comprises establishing, by the UE relay, an encrypted communication channel for conducting the sensitive transaction based on the blockchain, the encrypted communication channel extending between the application at the UE and the end point and traversing the UE relay.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
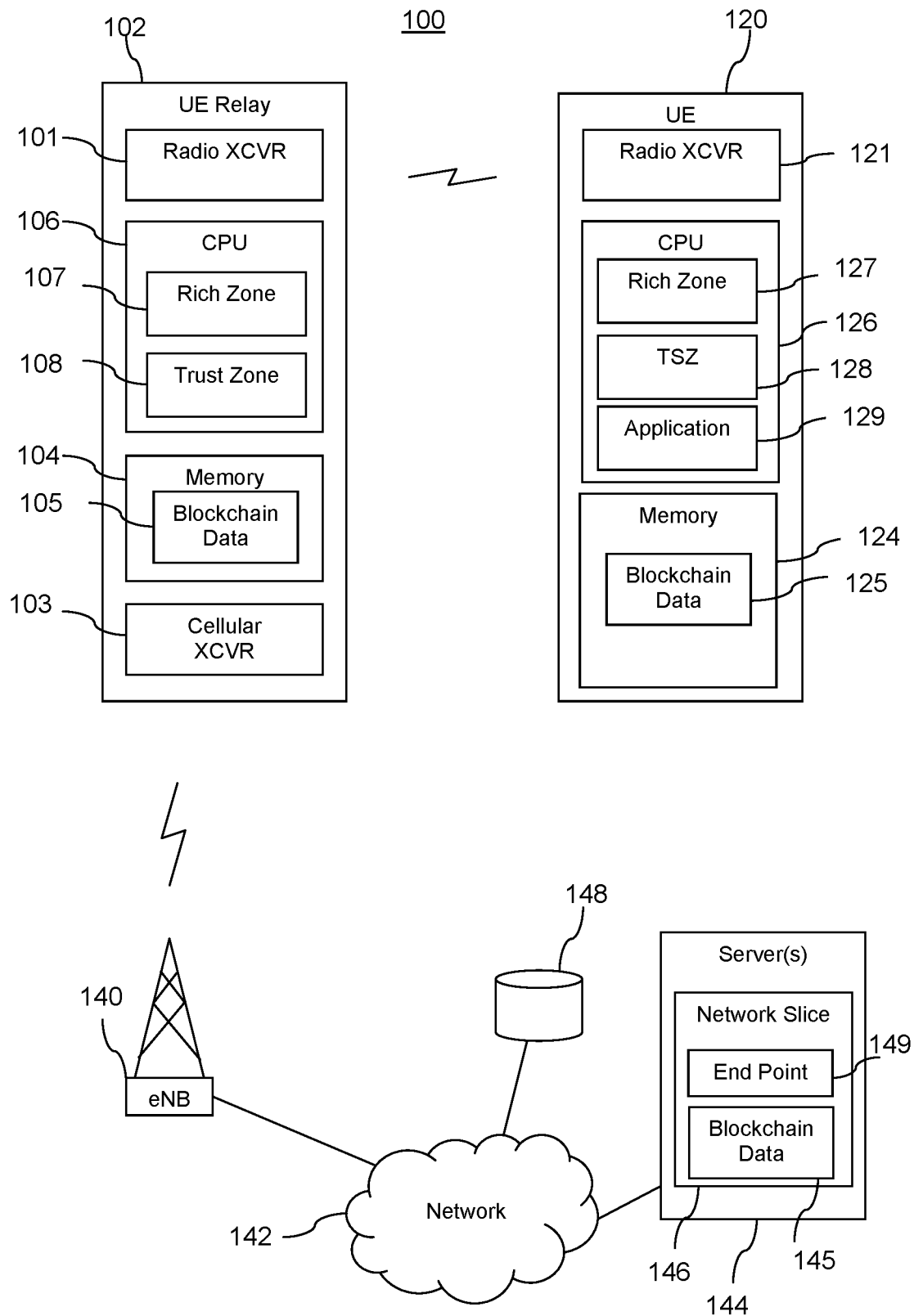
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A user equipment (UE) relay, also referred to as a wireless gateway, is an example mechanism for extending wireless coverage and security to a wide range of devices. A UE relay may also be referred to as a private gateway in some contexts. As used herein, a UE is any of a wide range of devices with Internet communication capability employed by end users. For example, a UE may include computers, tablets, smart phones, Internet of things (IoT) devices, etc. As such, a UE relay may be employed to act as a wireless communication anchor point for a broad range of UEs with different capabilities. In order to protect the network from malicious actors (e.g., hackers), a UE relay may also be expected to provide multiple approaches for securing communications between devices depending on the capabilities of the UEs involved.

In some use cases, an application operating on a UE may attempt to initiate a sensitive transaction without being aware that enhanced security is available. Such transactions may include communication of sensitive data (e.g., financial, medical, other private data, etc.) Many example network devices are configured to presume that security is managed at communication end points. Accordingly, such network devices generally forward communications from UEs without considering context. For example, many network devices are equipped with open systems interconnection (OSI) model layer one through layer four capabilities. Such capabilities generally do not include the ability to read and interpret packet data as such logic is generally managed by OSI layer seven capable devices at communication end points. Hence, communications that are not well secured by a UE may not be further secured by intermediate devices even when additional security is available. Further, such devices may employ network tunnels to secure communications. Such tunnels are generally static, reusable, and are setup between known end points. Such tunnels may not provide a complete security solution for certain UEs. For example, static tunnels may provide vulnerabilities if employed for an extended period of time (e.g., years) as the encryption of such static tunnels may be hacked over a long enough period of time. Such tunnels may also not be useful if the end point for such communications moves between communication sessions, as may occur when employing network slicing and other network virtualization technologies, for example in a distributed application context. In addition, network tunnels generally protect communications between devices. However, network tunnels may not protect communications between the operating environment of the application and the network port of the UE. As such, a UE that is hacked with malicious software may gain access to the network despite such tunnels.

The present disclosure teaches a system and method that provides a technical solution to various technical problems. Such problems include securing communications between an application operating environment and a tunnel end point in a UE, providing network security when at least one end point is not known in advance, and providing additional security of IoT devices that operate using predictable patterns over extended periods of time (e.g., on the order of years). Specifically, the present disclosure includes a UE relay that mediates network channels on behalf of a UE in a dynamic manner, where the UE may include a wide variety of devices including cell phones, computers, and/or IoT devices. In a first example, an application operating on a UE may determine to perform a sensitive transaction, such as transmitting private data, directing the payment of a bill, etc. The UE relay receives an indication of the sensitive transaction from the UE. In one example, the application employs an application programming interface (API) call that sends a message to the UE relay to provide such an indication. In another example, the UE relay receives an encrypted message from the UE. The UE relay reviews the packet using OSI layer seven logic and determines that the encrypted nature of the packet indicates that an application on the corresponding UE wishes to perform a sensitive transaction. The UE relay can then respond to the sensitive transaction indication by directing the application to initiate and/or reinitiate the communication from a trust operating environment. As used herein a trust operating environment, also known as a trusted security zone (TSZ), is an operating environment executed on a segregated and secure portion of a processor on the UE. Such a TSZ may prevent applications on the UE that are operating outside of the TSZ from viewing and/or controlling the content and/or associated parameters of the secure communication session.

Once executing in the TSZ, the application can communicate with the UE relay, which can then establish a downstream encrypted communication channel with the UE. The downstream encrypted communication channel can include a secure tunnel between the UE relay and the UE along with a secure channel from the UE communication port to the TSZ including the application. The application can then forward the end point for a communication session to the UE relay via the downstream encrypted communication channel. The UE relay can then use the end point to establish an upstream encrypted communication channel to the end point. The upstream encrypted communication channel may also include a tunnel. In this manner, the UE relay creates a secure end-to-end channel between the application at the UE and the end point. It should be noted that such tunnels may be considered private tunnels as only the application executing in the TSZ, the UE relay, and the end point may be aware of the tunnels. Further, the UE relay need not be aware of the end point when receiving the initial indication of the sensitive transaction. For example, the end point may reside in a virtualized 5G network slice, and hence such end point may move to different physical locations between communication sessions. Once the communication session is complete, the UE relay may tear the encrypted communication channel down. A different encrypted communication channel may then be created when the application wishes to engage in a subsequent sensitive transaction. Accordingly, the encrypted communication channel may be a one-time use channel. This may be beneficial as the transient nature of the encrypted communication channel may cause the channel to be completely secure from a practical standpoint. This is because a malicious actor would be unable to break the encryption before the channel is terminated, and breaking the encryption after the channel is terminated would not provide any benefit to the malicious actor as such information would not be useful in finding and breaking the encryption on a subsequent communication channel. Further, extending the communication channel from the UE communication port to the TSZ protects the sensitive transaction from interference by malicious applications that may have been installed on the UE. This may also protect the network as IoT devices may not be as secure as more complex UEs, and hence may represent a weak point in overall network security.

The forgoing example may be beneficial from a security and flexibility standpoint. However, transient network channels may create difficulty in tracking such transactions for verification purposes. To solve this issue, the preceding example can be modified to operate by employing blockchain technology. For example, the UE relay may be capable of generating a genesis block that forms the basis of a blockchain. Accordingly, the UE relay can create a genesis block in response to receiving an indication of a sensitive transaction. The UE relay can then forward the genesis block to the application over the downstream encrypted communication channel once such a channel is established between the UE relay and the TSZ at the UE. The application can create a life block that describes, or includes the identity of, the sensitive transaction and attach the life block to the blockchain. The life block may identify the end point. The application can store the blockchain at the UE in the TSZ and forward the blockchain back to the UE relay over the downstream encrypted communication channel. The UE relay can then determine the end point from the blockchain and setup the upstream communication channel. The blockchain can be stored at the UE relay and forwarded on to the end point over the upstream communication channel. The application and the end point can then add event blocks to the blockchain as the communication session proceeds. The blockchain is forwarded back and forth over the encrypted communication channel via the UE relay, which can also store the blockchain. As a result, the UE relay can maintain a blockchain that documents the sensitive transaction. The blockchain can be forwarded to a relevant server for verification when the communication session is complete. As such, the sensitive transaction can be fully documented despite the fact that the communication channel is transient.

The disclosed UE relay network channel mediation mechanisms provide many benefits. For example, the disclosed mechanisms allow encrypted channels to be created dynamically between changing end points, whereas many example network tunnels operate between statically defined end points. Further, security is provided all the way to the application, which secures the transaction from interference by potentially malicious software attempting to compromise the UE. In addition, providing OSI layer seven functionality in the UE relay allows for secure channels to be created even when the UE acting as a tunnel end point has not directed that such channels be created. Also, the transient nature of such channels further secure the UE from malicious interference, which may be beneficial for certain classes of simplistic IoT devices. Providing blockchain functionality provides an additional layer of verification in spite of the transient nature of the forgoing scheme. As such, the forgoing provides significant increased functionality by both the UE and the UE relay. Further, creating dynamic channels may alleviate a need to use static tunnels with high processing overhead. As such, the disclosed examples may allow the UE relay and/or the UE to operate with fewer communication resources (e.g., processor cycles, memory, etc.) Further, the forgoing provides solutions to problems that are specific to a network environment, namely by providing network security to a broad range of UEs that may or may not be setup to secure their own communications.

Turning now to FIG. 1, a communication system 100 is described. In an embodiment, the system 100 comprises a UE 120. The UE 120 can be any device capable of connecting to the Internet via any wireless communication technology. In some examples, the UE 120 may be a device that is capable of employing radio access network (RAN) based technologies via an evolved node B (enodeB) cell, such as a cell site 140. Such devices may include a mobile phone, a smart phone, a personal digital assistant (PDA), a headset computer, a wearable computer, a laptop computer, a notebook computer, a tablet computer, etc. In other cases, the UE 120 may be a device that is capable of employing local area network based wireless technologies such as Wifi, Bluetooth, or other wireless technologies that wirelessly connect to a local component that is connected to a local wired network connection. Such devices may include IoT devices as well as many of the previously mentioned devices. IoT devices include a large group of electronic devices and/or sensors capable of being controlled/actuated and/or providing feedback via network connections. As non-limiting examples, IoT devices can include consumer appliances, consumer electronics, automobiles, lighting systems, heating and air conditioning systems (e.g., thermostats), security systems, accounting systems (e.g., parking garages, toll systems, etc.) commercial and/or retail electronics, etc.

The communication system 100 can also include a UE relay 102. The UE relay 102 can be any device capable of acting as a communication gateway between a UE 120 and a cell site 140. The UE relay 102 can communicate with the UE 120 via RAN based wireless technologies, local network based wireless technologies, and even via wired communication technologies (e.g., Ethernet, universal serial bus (USB), etc.). The UE relay 102 is further configured to act as an anchor point to allow the UE 120 to connect to the RAN via the cell site 140. In some examples, a plurality of successive UE relays 102 can even be employed in a chain to connect the UE 120 to the cell site 140 or other device acting as a gateway into network 142. As such, the UE relay 102 may be considered a network edge device in some examples.

The system 100 further comprises a cell site 140, a network 142, a server 144, and a data store 148. The UE relay 102 is designed to communicate with the network 142 via the cell site 140 by using a cellular radio transceiver 103. In some examples, a plurality of UE relays 102 communicate with each other by employing radio transceivers 101, with a final UE relay 102 further communicating with the network 142 via the cell site 140 by using a cellular radio transceiver 103. The cell site 140 and at least a portion of the network 142 provides wireless communication service according to protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The network 142 comprises one or more public networks, one or more private networks, or a combination thereof. While a single cell site 140 is shown in FIG. 1, it is understood that the system 100 may comprise any number of cell sites 140. The data store 148 is a network accessible device configured to store data and retrieve such data upon request. The server 144 is a network accessible device configured to respond to requests over the network 142, as well as store, recall, and process data in attached memory and/or in the data store 148. While a single UE relay 102 and a single UE 120 are shown in FIG. 1, it is understood that the system 100 may comprise any number of such devices.

The UE 120 comprises at least a radio transceiver 121, a processor 126, and a memory 124. The configuration of such devices may vary widely depending on the example and the intended purpose of the UE 120. For example, the radio transceiver 121, processor 126, and memory 124 may be relatively complex when the UE 120 is a laptop computer and may be relatively simple when the UE 120 is a temperature sensor. As such, the UE 120 is described in terms of minimum capabilities. Specifically, the radio transceiver 121 is at least capable of communicating with a corresponding radio transceiver 101 at the UE relay 102 to transmit and/or receive packets of data relevant to the operation of the UE 120. As specific examples, the radio transceiver 121 may include an Institute of Electrical and Electronics Engineers (IEEE) 802.11 (WiFi) interface, an IEEE 802.15.1 (BLUETOOTH) interface, or other local area network based communication circuit. The processor 126 is capable of processing such data, and the memory 124 is capable of storing such data.

The UE 120 employs a TSZ 128. A TSZ provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the TSZ 128 in the main mobile device chipset and protecting the hardware root of trust removes the need for separate secure hardware to authenticate the device or user. To ensure the integrity of the applications requiring trusted data, such as a mobile financial services application, the TSZ 128 also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the TSZ 128 may be conceptualized as hardware assisted security.

A complete trusted execution environment (TEE) may be implemented through the use of the TSZ 128 hardware and software architecture. The trusted execution environment is an execution environment that is parallel to the execution environment of the main mobile device operating system. The trusted execution environment and/or the TSZ 128 may provide a base layer of functionality and/or utilities for use of applications that may execute in the TSZ 128. For example, in an embodiment, trust tokens may be generated by the base layer of functionality and/or utilities of the trusted execution environment and/or TSZ 128 for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The TSZ 128 is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The TSZ 128 is implemented by partitioning the hardware and software resources to exist in a secure subsystem which is not accessible to components outside the secure subsystem. The TSZ 128 is built into the processor architecture at the time of manufacture through hardware logic present in the TSZ 128 which enables a perimeter boundary between the secure partition and the normal partition. The TSZ 128 may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the TSZ 128.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the TSZ 128 by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The TSZ 128 runs a separate operating system that is not accessible to the device users. For security purposes, the TSZ 128 is not open to users for installing applications, which means users do not have access to install applications in the TSZ 128. This prevents corrupted applications or malware applications from executing powerful instructions reserved to the TSZ 128 and thus preserves the trust of the device. The security of the system is achieved at least in part by partitioning the hardware and software resources of the mobile phone so they exist in one of two partitions, the secure partition for the security subsystem and the normal partition for everything else. Placing the TSZ 128 in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The TSZ 128 runs a separate operating system for the secure partition that is installed by the mobile device manufacturer or vendor, and users are not able to install new applications in or alter the contents of the TSZ 128.

Accordingly, the processor 126 operates at least one application 129 in a rich zone 127, a TSZ 128, or combinations thereof. A rich zone 127 is an operating environment that provides an application 129 access to the full functionality of the processor 126. A TSZ 128 is an operating environment on a processor 126 that provides an application 129 access to a limited set of processor 126 resources. For example, the TSZ 128 may reside on a segregated circuit from the rich zone 127 in the processor 126. Information flow, data access, and/or control between the rich zone 127 and the TSZ 128 is restricted to a specified subset of the overall functionality of the processor 126. For example, an application 129 operating in the rich zone 127 can open an instance in the TSZ 128 for performing certain trusted activities. The application 129 instance operating in the rich zone 127 may be aware of inputs going into the TSZ 128 and outputs therefrom. However, the specifics of the operations in the TSZ 128 may be obscured from the portion of the application 129 in the rich zone 127. As such, privacy of the portions of the transaction occurring in the TSZ 128 can be generally assured. Further, the limited control allowed in the TSZ 128 may prevent malicious applications (malware) operating in the rich zone 127 from accessing and/or negatively impacting the control functions in the network 142.

The memory 124 may maintain data relevant to the UE 120. For example, the memory 124 may maintain data for the rich zone 127, which may be used by the application 129. The memory 124 may also contain data that is segregated for use by the TSZ 128. In some examples, the memory 124 may be configured to store blockchain data 125. For example, the store blockchain data 125 can be stored exclusively for use by the TSZ 128. The blockchain data 125 may include one or more blocks of data that reference each other to form a blockchain. For example, the blockchain data 125 may include a genesis block, at least one life block, and one or more event blocks. The blockchain data 125 is discussed further with reference to FIG. 2 below.

The UE relay 102 includes a radio transceiver 101, which may be substantially similar to a radio transceiver 121. Accordingly, the UE relay 102 may employ the radio transceiver 101 to communicate with the UE 120 and/or other UE relays 102. The UE relay 102 also comprises a processor 106, which may comprise a rich zone 107 and/or a TSZ 108. The rich zone 107 and TSZ 108 may be substantially similar to rich zone 127 and TSZ 128, respectively. The processor 106 capable of receiving and forwarding packets, for example by providing OSI layer one through OSI layer four functionality. Further, the processor 106 may comprise higher order functionality, such as OSI layer five through OSI layer one functionality. For example, the processor 106 may be capable of reviewing packets received from the UE 120 in the rich zone 107. The processor 106 may be configured to communicate with the UE 120 based on such a review. For example, the processor 106 may direct the UE 120 to establish a communication between the TSZ 128 and the TSZ 108 when the processor receives an indication of a sensitive transaction in the rich zone 127. Such indication of a sensitive transaction may include a packet from the UE 120 explicitly requesting a sensitive transaction and/or an encrypted packet from the UE 120, depending on the example.

The UE relay 102 further comprises a memory 104 capable of storing blockchain data 105, which may be substantially similar to memory 124 and blockchain data 125, respectively. The UE relay 102 may also comprise a cellular transceiver 103, which is a transceiver capable of wirelessly communicating with a RAN via the cell site 140.

As noted above, the UE relay 102 is capable of receiving an indication of a sensitive transaction from the UE 120. The UE relay 102 can then mediate the creation of encrypted communication channels between the UE 120 and an end point 149 in the network 142. In the example shown, the end point 149 resides in the one or more servers 144. In some examples, a 5G network slice 146 may contain the end point 149. A network slice 146 is a set of related functions provided by servers 144 and/or other nodes in network 142 in a virtualized manner. For example, a network slice 146 can be created, allocated, deallocated, moved, and/or destroyed dynamically as desired. In some examples, a network slice 146 may even be created on demand for use by an application 129 and deallocated thereafter. As such, a network slice 146, and hence an end point 149 may move between servers 149 as overall network load changes. Memory on the server(s) 144 may be allocated to the network slice 146 and can therefore contain data for use by the slice 146 and corresponding functions. In some examples, the sever(s) 144 and/or network slice 146 may contain blockchain data 145 in memory, wherein blockchain data 145 is substantially similar to blockchain data 125 and/or 105.

As noted above, the UE relay 102 may receive an indication of a sensitive transaction from the application 129 operating on the UE 120. The UE relay 102 may direct the application 129 to open an instance in the TSZ 128 and establish an encrypted communication channel to the TSZ 108 on the UE relay 102. For clarity, the encrypted communication channel between the UE relay 102 and the UE 120 may be referred to herein as the downstream encrypted communication channel. Such an encrypted communication channel may include an encrypted network tunnel, such as a Multiprotocol Label Switching (MPLS) tunnel, between radio transceiver 101 and the radio transceiver 121. The encrypted communication channel also includes a path inside the UE relay 102 between the radio transceiver 101 and the TSZ 108. Further, the encrypted communication channel also includes a path between the radio transceiver 121 and the TSZ 128 in the UE 120. This results in a private communication channel directly from the application 129 as operating in the TSZ 128 to the TSZ 108 at the UE relay 102. This approach protects the application 129 from interactions from malware that may be operating on the UE 120 in the rich zone 127.

Once the downstream encrypted communication channel is created, the application 129 can securely and privately communicate the end point 149 to the UE relay 102. Such communication may include the address of the end point 149, a mechanism for determining the address of the end point 149, and/or directions for initiating a network slice 146 including the end point 149, depending on the example. The UE relay 102 can then create an upstream encrypted communication channel from the TSZ 108 to the end point 149. The upstream encrypted communication channel may include an encrypted tunnel, allocated network slice 146 resources (e.g., service function chains), and/or other secure pathways to the end point 149. This allows the application 129 to communicate privately and securely from the TSZ 128 to the end point 149. Accordingly, malicious actors may be unable to determine the identity of the application 129 and/or the contents of the transaction from any intermediate point. The UE relay 102 can also tear down the encrypted communication channel after completion of a communication session. In this way, a device sniffing packets would be unable to break the encryption over hours or days and store such data for later use. Specifically, a subsequent encrypted communication channel may employ different encryption and/or a different route, which may render such information moot.

Due to the transient nature of such communication channels, the UE relay 102, the UE 120, and/or the end point 149 may use blockchains to store relevant data for later verification, for example when the sensitive transaction is a monetary transaction (e.g., which may use unrelated blockchains). For example, the UE relay 102 may generate a genesis block for communication to the application 129 at the UE 120. The application 129 at the UE 120 (in the TSZ 128) can provide communication parameters (e.g., the end point 149) in the blockchain. Events in the communication can be stored in the blockchain. The blockchain can be shared between the devices and copies stored as blockchain data 105, 125, and/or 145.

It should be noted that the encrypted communication channel may not be set with a committed information rate (CIR) in some examples. For example, different encrypted communication channels may be employed for different types of UEs 120. For example, the UE relay 102 may provide different levels of priority and resources to different UEs 120 by sorting such UEs 120 into classes. In a first example, UEs 120 that rarely communicate (e.g., once a month) with low priority information (e.g., power meters, water meters, etc.) may be considered low priority class devices. Low priority class devices may be provided with encrypted communication channels that employ best effort communication instead of CIR based communication. For examples, such tunnels may be created on a timer, and may be delayed to times of low network 142 usage. Other UEs 120 may be considered medium priority class. Such medium priority class UEs 120 may be provided with encrypted communication channels and provided access to logic at the UE relay 102. Other UEs 120 may be considered high priority class, for example devices capable of making complex requests and/or providing time sensitive information. The UE relay 102 may provide high priority UEs 120 with additional priority processing, access to additional computational resources, and/or communication analytics along with the encrypted communication channels.

Figure 2:
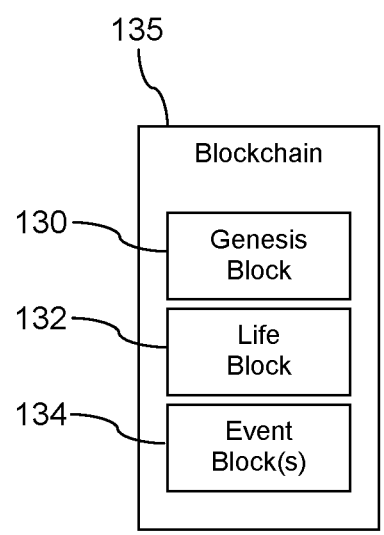
FIG. 2 is a block diagram of a blockchain data structure according to an embodiment of the disclosure.

Turning now to FIG. 2, a blockchain 135 data structure is described. For example, the blockchain 135 may be created, updated, and/or stored in the UE 120, UE relay 102, and/or server(s) 144 as blockchain data 105, 125, and/or 145, respectively. In an embodiment, a blockchain 135 comprises a genesis block 130, at least one life block 132, and one or more event blocks 134. The blockchain 135 may comprise any number of life blocks 132 and event blocks 134. The blocks in the blockchain 135 may share some common elements that are associated with blockchain technology, for example a hash value of a preceding block (with the exception of the genesis block 130 which is the first block in the blockchain 135), a data portion of the block, a hash value determined over the block itself, and/or a nonce value determined such that the hash value of the block exhibits some readily distinguishable characteristic, such as a predefined number of zeros in the most significant bits of the hash. The blocks may further comprise an indication of the category of the block, for example an indication in the genesis block 130 that it is a genesis block, an indication in the life block 132 that it is a life block, an indication in the event blocks 134 that it is an event block, etc.

The genesis block 130 may be created by the UE relay 102. For example, the processor 106 of the UE relay 102 may create the genesis block 130 upon receiving an indication of a sensitive transaction from an application 129. As such, the blockchain 135 may track the events of the corresponding transaction. The genesis block 130 may comprise data in a data field indicating a time stamp of genesis block 130 creation, data identifying the UE relay 102, and other information. The life block 132 may be created by the UE 120. The life block 132 may comprise data in a data field identifying the UE 120, data identifying the end point 149 and/or a mechanism to determine and/or create the end point 149, data identifying the sensitive transaction, other parameters describing the sensitive transaction, and/or other parameters describing the communication session. The life block 132 may also comprise data recording events or steps experienced by the UE 120 during establishment of the encrypted communication channel(s) and/or corresponding tunnels. The event blocks 134 may be created by the application 129, the UE relay 102, and/or the end point 149. For example, the application 129 may create an event block 134 for one or more messages sent from the application 129 and/or UE 120. Further, the end point 149 may create an event block 134 for one or more messages sent from the end point 149 and/or server 144. The UE relay 102 may also create an event block 134 when desired, to indicate when the encrypted communication channel(s) have been torn down at the termination of a communication session. Updates to the blockchain 135 may be shared between the UE 120, the UE relay 102, and/or the end point 149. Further, the blockchain 135 may be pushed from the UE relay 102 to a reporting server for verification of the transaction in some instances. It should also be noted that, in some examples, write privileges may be limited to a single device, for example to the UE relay 102. In such an example, the blockchain 135 is not used to communicate data related to the sensitive transaction, and is instead used solely to record such data for later verification.

Figure 3:
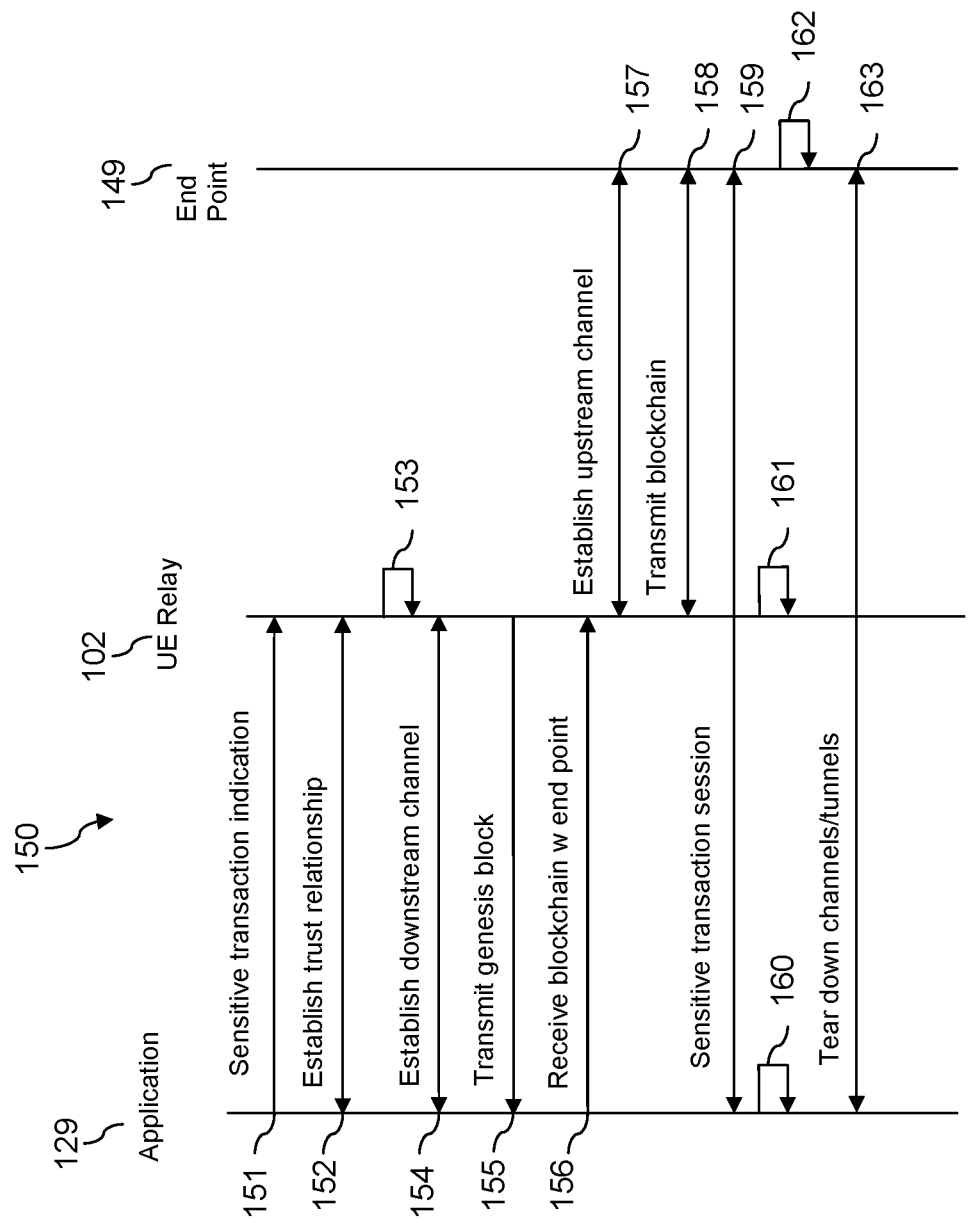
FIG. 3 is a message sequence diagram of a mechanism for mediating encrypted communication channels between a UE and an end point by a UE relay according to an embodiment of the disclosure.

Turning now to FIG. 3, a message sequence 150 is described. In an embodiment, the message sequence 150 supports mediating encrypted communication channels between an application 129 on a UE 120 and an end point 149 by employing a UE relay 102, for example as shown in FIG. 1. Specifically, message sequence 150 describes an example where a UE relay 102 receives an indication of a sensitive transaction from an application 129 and manages the creation and termination of encrypted communication channels to the end point 149 to maintain the privacy and security of the transaction.

For purposes of simplicity, message sequence 150 presumes that the UE 120 has already established a wireless link with the UE relay 102 to support communication to and from the network 142. Prior to the initiation of message sequence 150, the application 129 determines to perform a sensitive transaction. Such a sensitive transaction may include a monetary exchange, such as a payment using a credit card, a payment via blockchain technology, etc. As a specific example, an automobile acting as a UE 120 may be configured to automatically pay for food upon passing through a drive through window at a restaurant. As another specific example, a refrigerator acting as a UE 120 may determine that an item is out of stock and automatically place an order for a refill. In other examples, the UE 120 may be a smart phone, a tablet, a computer, etc. and the sensitive transaction may be a payment for an item over the Internet. As another example, such a sensitive transaction may include a billing event. As a specific example, a parking garage acting as a UE 120 may be configured to send an electronic bill when an automobile enters or leaves the garage. As another specific example, a heating ventilation and air conditioning (HVAC) system in a building may act as the UE 120 and may be configured to send a monthly bill to an entity that is renting a space in the building. As another example, such a sensitive transaction may include a transfer of private data. As a specific example, a medical device in a patient's room may periodically transmit personal health data related to the patient. As can be seen, the application 129, the UE 120, and the sensitive transaction may include a large number of example embodiments. Regardless of the example, the application 129 desires to privately and securely send some sort of private data.

At label 151, the application 129 sends a sensitive transaction indication. The sensitive transaction indication may include several example embodiments. In a first example, the application 129 may initiate an API call to an application operating on the UE relay 102. Specifically, the application 129 may establish an instance in a TSZ and send a message including the sensitive transaction indication from the TSZ at the UE 120 to a TSZ at the UE relay 102. In such a case, the sensitive transaction indication directs the UE relay 102 to create an encrypted communication channel for use by the sensitive transaction. In other cases, the application 129 may not be configured to interact directly with the higher level functions of the UE relay 102. In such a case, the application 129 may encrypt a first packet and attempt to forward the encrypted first packet toward the network 142 via the UE relay 102.

At label 152, a trust relationship is established between the application 129 and the UE relay 102. Label 152 may be optional, depending on the example. For example, label 152 may be omitted in cases where the application 129 employs an API call to the UE relay 102 as a trust relationship may already exist in such a case. In another example, the sensitive transaction indication is an encrypted message (e.g., a packet) from the application 129 received at the UE relay 102. For example, the UE relay 102 may review packets traversing the UE relay 102 in the UE relay's 102 rich zone, and may note that the packet is encrypted and should traverse the TSZ. The UE relay 102 may drop the packet and transmit a message back to the application to initiate a trust relationship. The application 129 may create an instance in the TSZ at the UE 120 and perform any desired handshake messaging to establish the trust relationship with the UE relay 102.

At label 153, the UE relay 102 may generate a genesis block of a blockchain 135 to track the sensitive transaction. The use of blockchain 135 is an optional implementation, and hence label 153 and associated steps related to blockchain are therefore optional.

At label 154, the UE relay 102 establishes a downstream encrypted communication channel with the application 129. The downstream encrypted communication channel may include an encrypted tunnel from a downstream port at the UE relay 102 to an upstream port at the UE 120. The downstream encrypted communication channel may also include a secure path between such ports and corresponding TSZs at the UE relay 102 and the UE 120. Hence, the downstream encrypted communication channel securely connects the application 129 to the TSZ at the UE relay 102. The establishment of the downstream encrypted communication channel may be initiated by the UE relay 102 or by the application 129, depending on the example.

At label 155, the UE relay 102 transmits the genesis block of the blockchain 135 to the application 129 via the downstream encrypted communication channel. The application 129 can then generate a life block containing the relevant details for the communication session for the sensitive transaction. For example, the life block may include data indicating the end point 149 for the communication. The application 129 may then forward the updated blockchain 135 with the life block to the UE relay 102 via the downstream encrypted communication channel at label 156. In the examples where the blockchain 135 is not used, the application 129 may instead forward a message containing data indicating the end point 149 to the UE relay 102 via the downstream encrypted communication channel at label 156. Depending on the example, the UE relay 102 then receives blockchain 135 and/or the data indicating the end point 149.

Once the end point 149 is known to the UE relay 102, the UE relay 102 can establish an upstream encrypted communication channel to the end point 149 at label 157. Establishing the upstream encrypted communication channel may be accomplished by multiple mechanisms, depending on the example. In the event that the end point 149 is an address at a dedicated server 144, the UE relay 102 can establish one or more network tunnels and/or TSZ based communication path(s) to the end point 149. In other cases, the UE relay 102 may employ an algorithm to determine the current address of the end point 149, and then establish the channel. In a 5G network, the end point 149 may reside in a network slice 146. In the event that the slice 146 is not currently active, the UE relay 102 may employ a service creation extension function to create the slice 146 in order to provide a path to end point 149. For example, the end point 149 and associated functions may be initiated for the session and then torn down at the completion of the session. Regardless of the example, the UE relay 102 establishes the upstream encrypted communication channel with the end point 149 at label 157. This provides an end-to-end encrypted communication channel between the application 129 in a TSZ and the end point 149 that traverses the UE relay 102.

In examples that employ the blockchain 135, the UE relay 102 can transmit a copy of the blockchain 135 to the end point via the upstream encrypted communication channel at label 158. In this way, the application 129, the UE relay 102, and the end point 149 all have secure access (e.g., in a TSZ) to the blockchain 135.

At label 159, the application 129 and the end point 149 communicate as desired to complete the sensitive transaction. In an example, the application 129 and/or the end point 149 updates the blockchain 135 with event blocks whenever a message is sent as part of the transaction and forwards the updated blockchain 135. The application 129, the UE relay 102, and the end point 149 can then store updates to the blockchain 135 (e.g., upon receipt) at labels 160, 161, and 162, respectively.

Once the sensitive transaction is complete, the UE relay 102 can tear down the related channels and/or tunnels at label 163. In some cases, the UE relay 102 may even tear down the network slice 146 and/or end point 149 at label 163. Accordingly, the upstream encrypted communication channel and the downstream encrypted communication channel may act as a transient one time use channel, which may be much more difficult, if not impossible, for an outside listener to break from an encryption standpoint in time to be useful. The UE relay 102 can also forward the completed blockchain 135 to a designated server for verification of the sensitive transaction as part of label 163 in some examples.

It should also be noted that some blockchain 135 technology may be implemented so that a single device has write access to the blockchain 135. In such an example, the blocks of the blockchain 135 may be created and stored at the UE relay 102 in response to the relevant events as described above. In such a case, the information for the blocks is transmitted to the UE relay 102 from the application 129 and/or the end point 149 in packets via the encrypted communication tunnels instead using the blockchain 135 to communicate such details. In such a case, the blockchain 135 may still be shared between the UE relay 102, from the application 129, and the end point 149 for record keeping purposes as desired.

Figure 4:
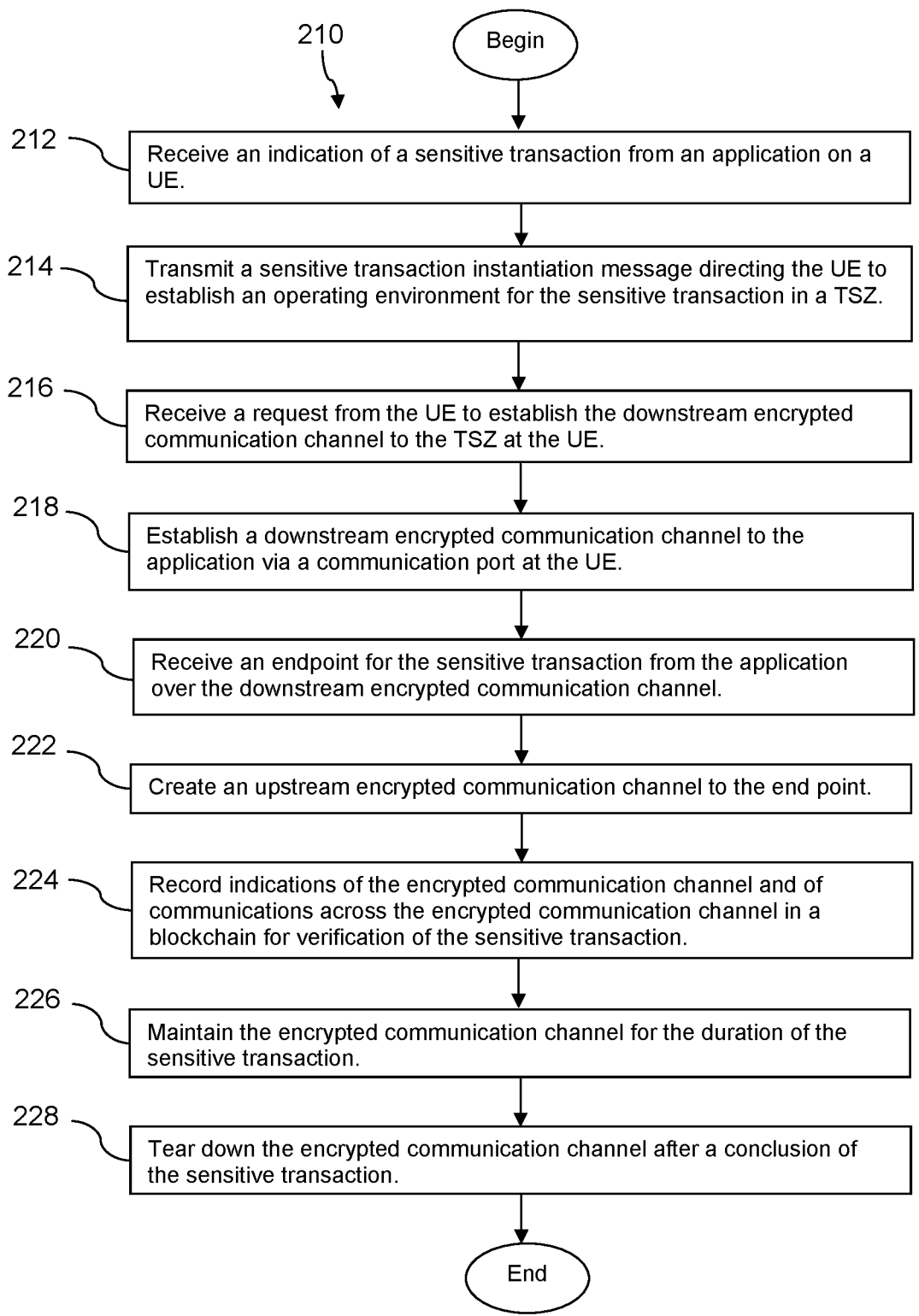
FIG. 4 is a flow chart of a method of mediating encrypted communication channels by a UE relay according to an embodiment of the disclosure.

Turning now to FIG. 4, a method 210 is described. In an embodiment, the method 210 supports mediating an encrypted communication channel between an application 129 on a UE 120 and an end point 149 via a UE relay 102. Specifically, method 210 is described from the perspective of the UE relay 102.

At block 212, the UE relay 102 receives an indication of a sensitive transaction from an application 129 operating on a UE 120. In some examples, the indication of the sensitive transaction is a transaction request packet received by the UE relay 102 from the UE 120. In such a case, the transaction request packet is generated by the UE 120 based on an API call from the application 129. Such an example may occur when the application 129 is configured to communicate directly with the UE relay 102 instead of using the UE relay 102 solely as a network anchor point. In another example, the indication of the sensitive transaction is an encrypted packet received by the UE relay 102 from the UE 120. In such a case, the UE relay 102 deduces that the transaction is sensitive from the encrypted nature of the packet.

At block 214, the UE relay 102 determines to establish a downstream encrypted communication channel for the sensitive transaction based on the sensitive transaction indication of block 212. Specifically, the UE relay 102 transmits a sensitive transaction instantiation message, which is any message capable of directing the UE 120 to establish an operating environment for the sensitive transaction in a TSZ 128. The UE relay 102 may then receive a request from the UE 120 to establish the downstream encrypted communication channel to the TSZ 128 at the UE 120 at block 216.

Once the UE relay 102 is in communication with the application 129 in the TSZ, the UE relay 102 can establish a downstream encrypted communication channel to the application 129 via a communication port at the UE 120 at block 218. It should be noted that the end point 149 for the sensitive transaction may not be known to the UE relay 102 until after establishing the downstream encrypted communication channel to the application 129 at block 218.

The UE relay 102 may then receive an end point 149 for the sensitive transaction from the application 129 over the downstream encrypted communication channel at block 220. Once the end point 149 is known, the UE relay 102 can create an upstream encrypted communication channel to the end point 149 at block 222. In some examples, creating the upstream encrypted communication channel may include communicating with a network 142 to access a network slice 146 to act as part of a network tunnel between the UE 120 and the end point 149. The downstream encrypted communication channel of block 218 and the upstream encrypted communication channel of block 222 may collectively secure the sensitive transaction from an API of the application 129 at the UE 120 to an API of a destination application at the end point 149 to provide an end-to-end security solution.

Once the encrypted communication channel is complete from the application 129 to the end point 149, the sensitive transaction can occur over the channel. In some examples, at block 224, the UE relay 102 may record indications of the downstream encrypted communication channel, indications of the upstream encrypted communication channel, and indications of communications across the downstream encrypted communication channel and the upstream encrypted communication channel in a blockchain for verification of the sensitive transaction.

The UE relay 102 may also maintain the upstream encrypted communication channel and the downstream encrypted communication channel for the duration of the sensitive transaction at block 226. At block 228, the UE relay 102 can tear down the upstream encrypted communication channel and the downstream encrypted communication channel after a conclusion of the sensitive transaction. In this manner, the upstream encrypted communication channel and the downstream encrypted communication channel operate over a single use network tunnel.

Figure 5:
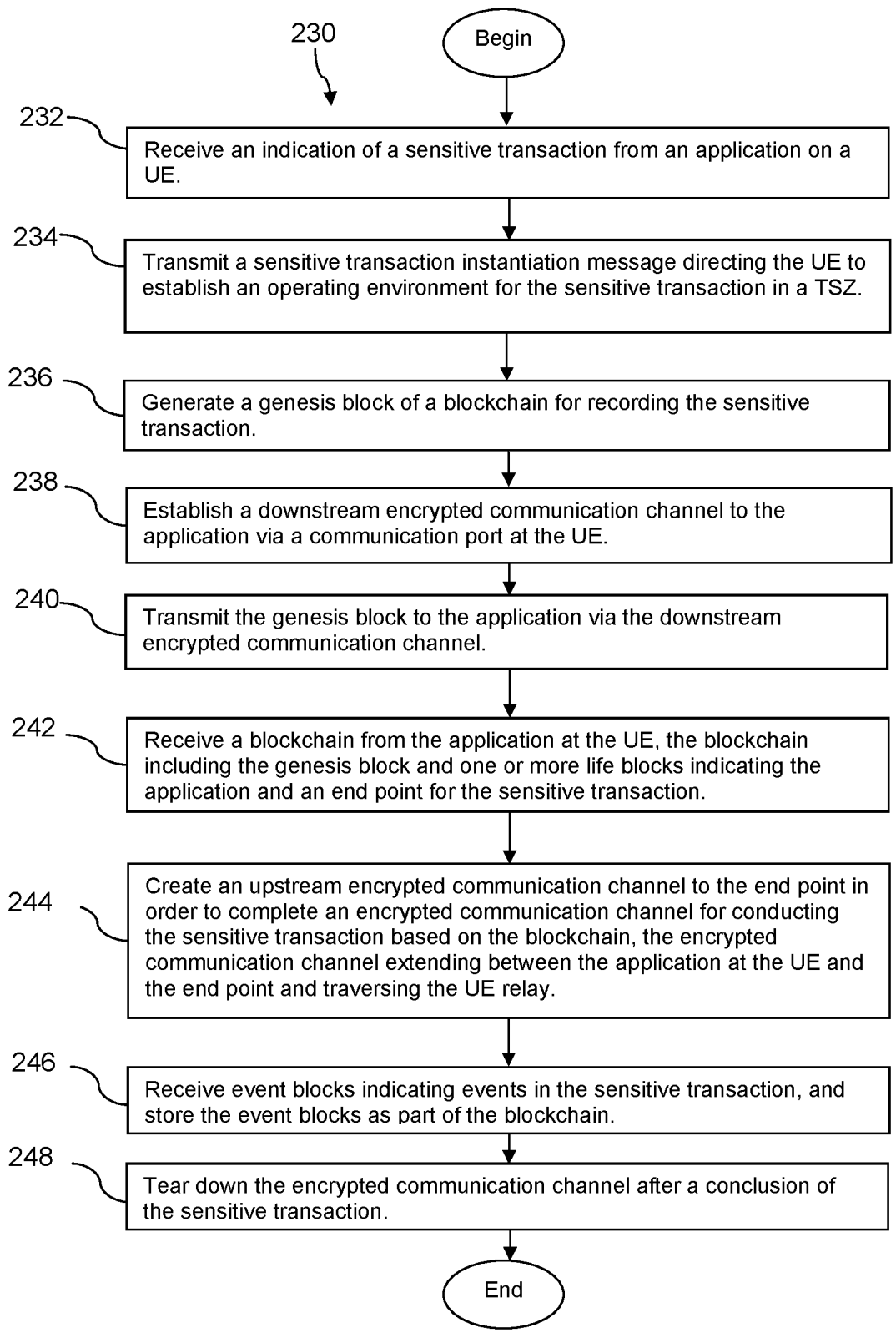
FIG. 5 is a flow chart of a method of employing blockchains to mediate encrypted communication channels by a UE relay according to an embodiment of the disclosure.

Turning now to FIG. 5, a method 230 is described. In an embodiment, the method 230 supports mediating an encrypted communication channel between an application 129 on a UE 120 and an end point 149 via a UE relay 102. Specifically, method 230 is described from the perspective of the UE relay 102 and focuses on examples that employ blockchain 135.

At block 232, the UE relay 102 receives an indication of a sensitive transaction from an application 129 operating on a UE 120 in a manner that is substantially similar to block 212 of method 210. At block 234, the UE relay 102 transmits a sensitive transaction instantiation message to establish an operating environment for the sensitive transaction in a TSZ 128 in a manner that is substantially similar to block(s) 214 of method 210.

At block 236, the UE relay 102 generates a genesis block of a blockchain 135 for recording the sensitive transaction. At block 238, the UE relay 102 creating a downstream encrypted communication channel to the application 129 via a communication port at the UE 120 in a manner that is substantially similar to block 218 of method 210. The downstream encrypted communication channel is employed to communicate the genesis block and the associated blockchain 135 between the UE relay 102 and the application 129.

At block 240, the UE relay 102 transmits the genesis block of the blockchain 135 to the application 129 via the downstream encrypted communication channel. Specifically, the genesis block may be transmitted to the application 129 in the TSZ 128. Then at block 242, the UE relay 102 receives the blockchain 135 back from the application 129 at the UE 120. For example, the blockchain 135 may be received from the application 129 in the TSZ 128. The received blockchain 135 includes the genesis block and one or more life blocks indicating the application 129 and an end point 149 for the sensitive transaction. It should be noted that the end point 149 is not known to the UE relay 102 until after receiving the blockchain 135 from the application 129 at the UE 120.

At block 244, the UE relay 102 creates an upstream encrypted communication channel to the end point 149 in a manner similar to block 222 of method 210. The upstream encrypted communication channel is employed to communicate the blockchain between the UE relay 102 and the end point 149. Further, the upstream encrypted communication channel and the downstream encrypted communication channel, when taken together establish an encrypted communication channel for conducting the sensitive transaction based on the blockchain 135. Specifically, the encrypted communication channel extends between the application 129 at the UE 120 and the end point 149 and traverses the UE relay 102. Further, the encrypted communication channel extends from the TSZ 128 at the UE 120 to the end point 149 via the UE relay 102. Hence, the upstream encrypted communication channel completes the encrypted communication channel. The UE relay 102 may also transmit the blockchain 135 to the end point 149 via the upstream encrypted communication channel. As noted above, the end point 149 may reside in a network slice 146. Accordingly, establishing the encrypted communication channel may include communicating with a network to access the network slice 146 to act as part of a network tunnel between the UE 120 and the end point 149.

At block 246, the UE relay 102 can receive event blocks as part of the blockchain 135 over the course of the session for the sensitive transaction. Such blocks may indicate events in the sensitive transaction. The UE relay 102 can store the event blocks as part of the blockchain 135 for use in performing verification of the sensitive transaction.

At block 248, the UE relay 102 can tear down the encrypted communication channel after the conclusion of the sensitive transaction in a manner similar to block 228 of method 210. As the encrypted communication channel is torn down in this manner, the encrypted communication channel may operates over a single use network tunnel between the UE 120 and the end point 149. Accordingly, the blockchain 135 may be stored to act as verification of events occurring over the single use network tunnel.

Figure 6:
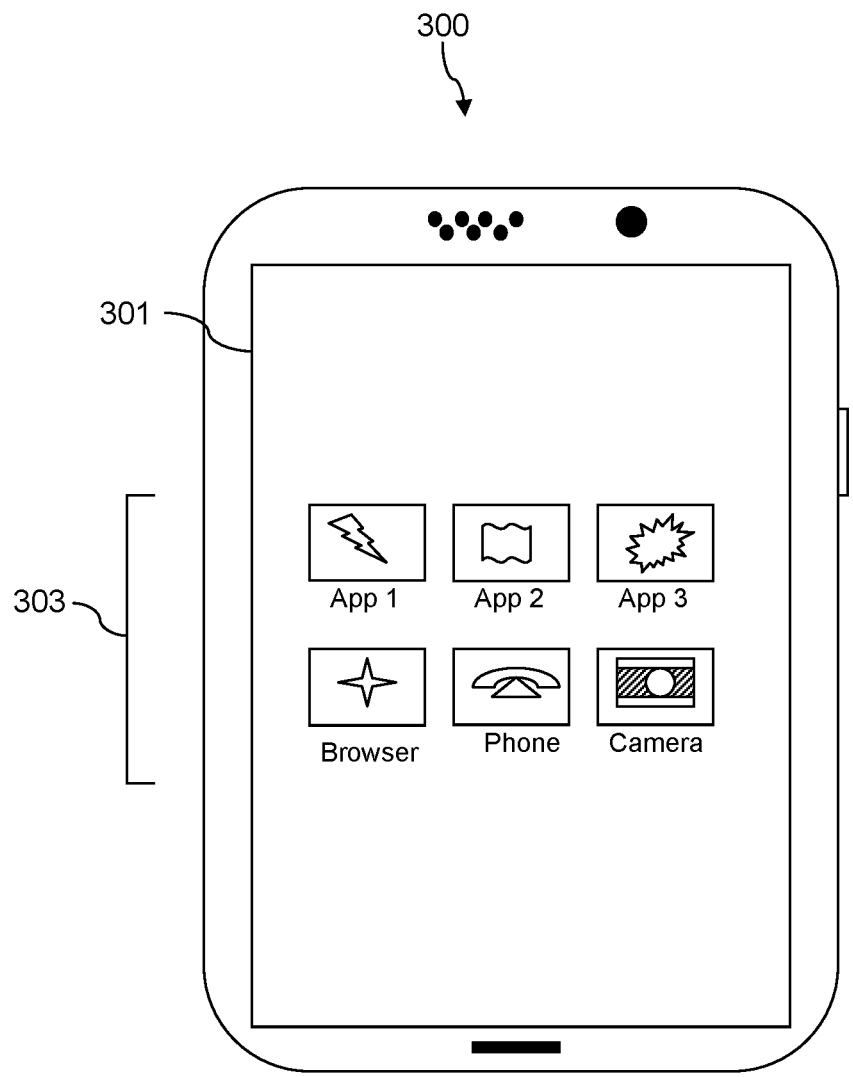
FIG. 6 is an illustration of a mobile communication device according to an embodiment of the disclosure.

FIG. 6 depicts the user equipment (UE) 300, which is operable for implementing aspects of the present disclosure, but the present disclosure should not be limited to these implementations. Though illustrated as a mobile phone, the UE 300 may take various forms including a wireless handset, a pager, a personal digital assistant (PDA), a gaming device, a media player, and/or an IoT device. The UE 300 includes a touchscreen display 301 having a touch-sensitive surface for input by a user. A small number of application icons 303 are illustrated within the touch screen display 301. It is understood that in different embodiments, any number of application icons 303 may be presented in the touch screen display 301. In some embodiments of the UE 300, a user may be able to download and install additional applications on the UE 300, and an icon associated with such downloaded and installed applications may be added to the touch screen display 301 or to an alternative screen. The UE 300 may have other components such as electro-mechanical switches, speakers, camera lenses, microphones, input and/or output connectors, and other components as are well known in the art. The UE 300 may present options for the user to select, controls for the user to actuate, and/or cursors or other indicators for the user to direct. The UE 300 may further accept data entry from the user, including numbers to dial or various parameter values for configuring the operation of the handset. The UE 300 may further execute one or more software or firmware applications in response to user commands. These applications may configure the UE 300 to perform various customized functions in response to user interaction. Additionally, the UE 300 may be programmed and/or configured over-the-air, for example from a wireless base station, a wireless access point, or a peer UE 300. The UE 300 may execute a web browser application which enables the touch screen display 301 to show a web page. The web page may be obtained via wireless communications with a base transceiver station, a wireless network access node, a peer UE 300 or any other wireless communication network or system.

Figure 7:
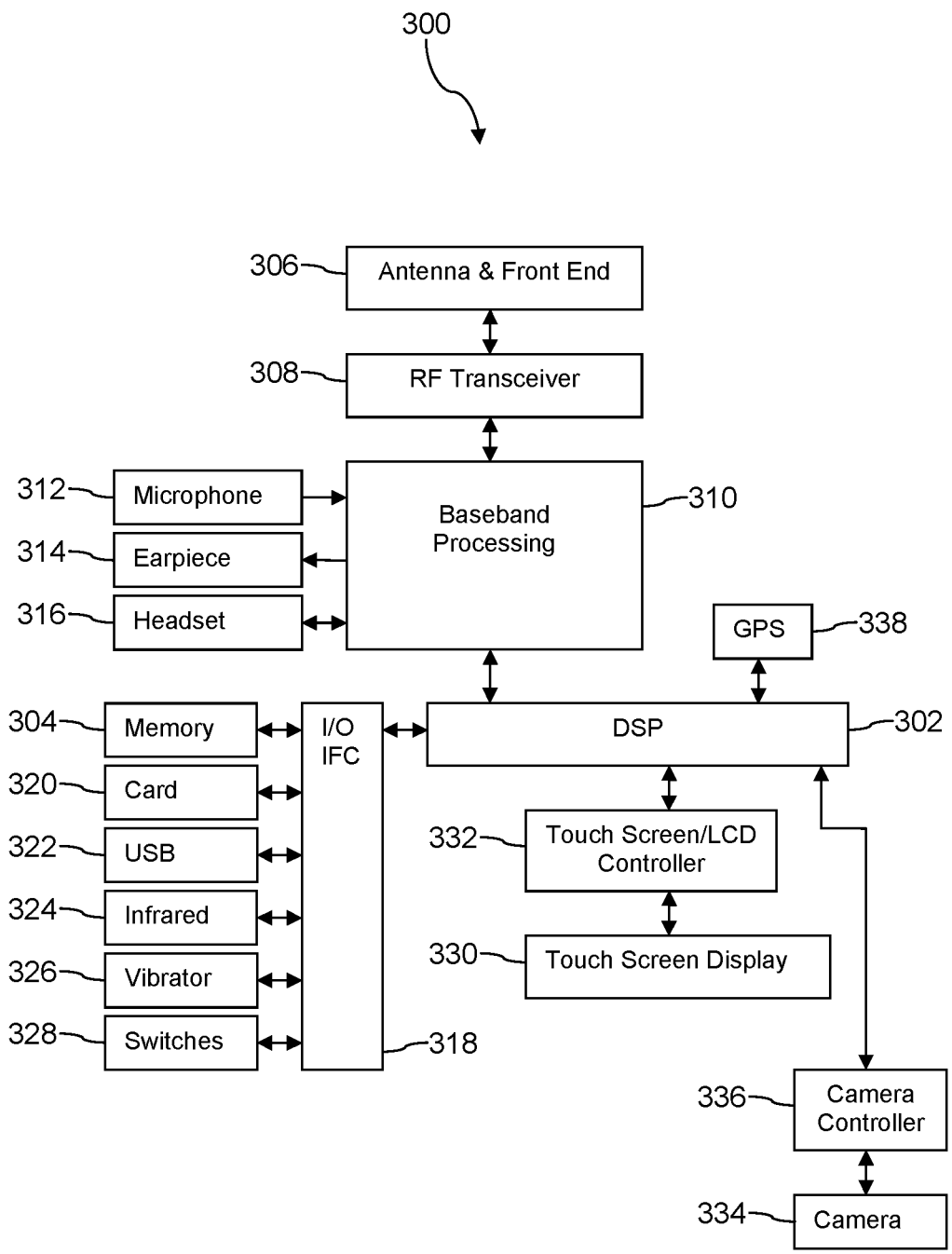
FIG. 7 is a block diagram of a hardware architecture of a mobile communication device according to an embodiment of the disclosure.

FIG. 7 shows a block diagram of the UE 300. While a variety of known components of handsets are depicted, in an embodiment a subset of the listed components and/or additional components not listed may be included in the UE 300. The UE 300 includes a digital signal processor (DSP) 302 and a memory 304. As shown, the UE 300 may further include an antenna and front end unit 306, a radio frequency (RF) transceiver 308, a baseband processing unit 310, a microphone 312, an earpiece speaker 314, a headset port 316, an input/output interface 318, a removable memory card 320, a universal serial bus (USB) port 322, an infrared port 324, a vibrator 326, one or more electro-mechanical switches 328, a touch screen liquid crystal display (LCD) with a touch screen display 330, a touch screen/LCD controller 332, a camera 334, a camera controller 336, and a global positioning system (GPS) receiver 338. In an embodiment, the UE 300 may include another kind of display that does not provide a touch sensitive screen. In an embodiment, the UE 300 may include both the touch screen display 330 and additional display component that does not provide a touch sensitive screen. In an embodiment, the DSP 302 may communicate directly with the memory 304 without passing through the input/output interface 318. Additionally, in an embodiment, the UE 300 may comprise other peripheral devices that provide other functionality.

The DSP 302 or some other form of controller or central processing unit operates to control the various components of the UE 300 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB port 322 and the infrared port 324. The USB port 322 may enable the UE 300 to function as a peripheral device to exchange information with a personal computer or other computer system. The infrared port 324 and other optional ports such as a Bluetooth® interface or an IEEE 802.11 compliant wireless interface may enable the UE 300 to communicate wirelessly with other nearby handsets and/or wireless base stations. In an embodiment, the UE 300 may comprise a near field communication (NFC) transceiver. The NFC transceiver may be used to complete payment transactions with point-of-sale terminals or other communications exchanges. In an embodiment, the UE 300 may comprise a radio frequency identify (RFID) reader and/or writer device.

The switches 328 may couple to the DSP 302 via the input/output interface 318 to provide one mechanism for the user to provide input to the UE 300. Alternatively, one or more of the switches 328 may be coupled to a motherboard of the UE 300 and/or to components of the UE 300 via a different path (e.g., not via the input/output interface 318), for example coupled to a power control circuit (power button) of the UE 300. The touch screen display 330 is another input mechanism, which further displays text and/or graphics to the user. The touch screen LCD controller 332 couples the DSP 302 to the touch screen display 330. The GPS receiver 338 is coupled to the DSP 302 to decode global positioning system signals, thereby enabling the UE 300 to determine its position.

Figure 8A:
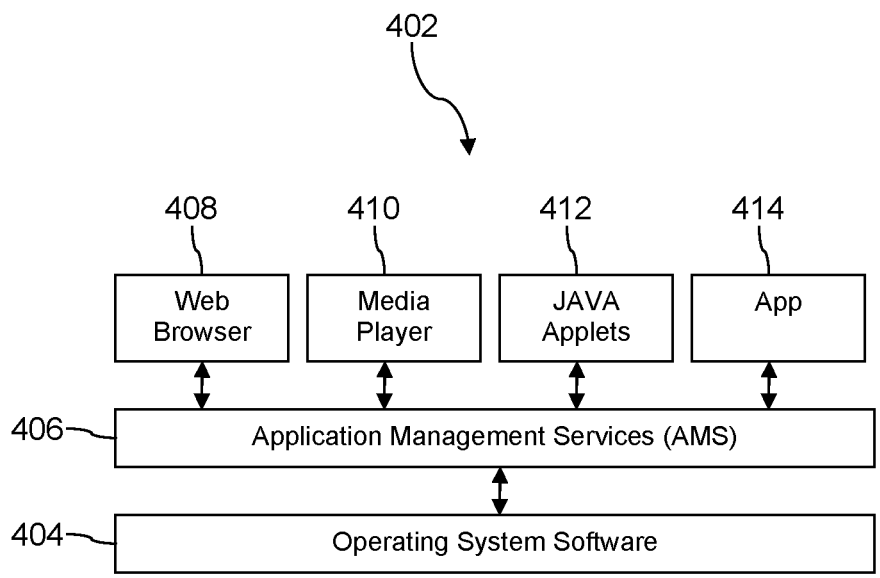
FIG. 8A is a block diagram of a software architecture of a mobile communication device according to an embodiment of the disclosure.

FIG. 8A illustrates a software environment 402 that may be implemented by the DSP 302. The DSP 302 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services (AMS) 406 that transfer control between applications running on the UE 300. Also shown in FIG. 8A are a web browser application 408, a media player application 410, JAVA applets 412, and application 414. The web browser application 408 may be executed by the UE 300 to browse content and/or the Internet, for example when the UE 300 is coupled to a network via a wireless link. The web browser application 408 may permit a user to enter information into forms and select links to retrieve and view web pages. The media player application 410 may be executed by the UE 300 to play audio or audiovisual media. The JAVA applets 412 may be executed by the UE 300 to provide a variety of functionality including games, utilities, and other functionality. The application 414 may be employed to implement an LPA, such as LPA 118 and/or 138. As such, the application 414 may be employed to manage eSIM credentials as described in detail above.

Figure 8B:
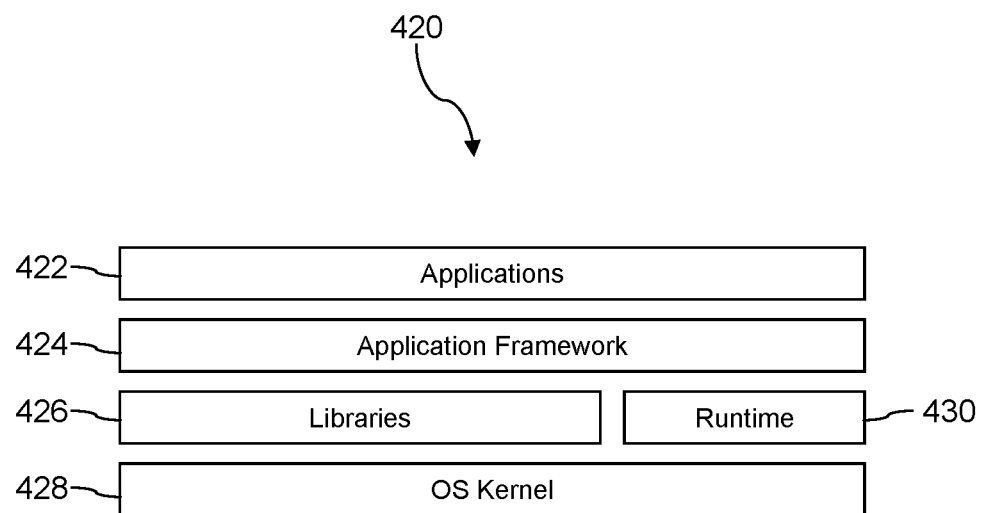
FIG. 8B is a block diagram of another software architecture of a mobile communication device according to an embodiment of the disclosure.

FIG. 8B illustrates an alternative software environment 420 that may be implemented by the DSP 302. The DSP 302 executes operating system kernel (OS kernel) 428 and an execution runtime 430. The DSP 302 executes applications 422 that may execute in the execution runtime 430 and may rely upon services provided by the application framework 424. Applications 422 and the application framework 424 may rely upon functionality provided via the libraries 426.

Figure 9:
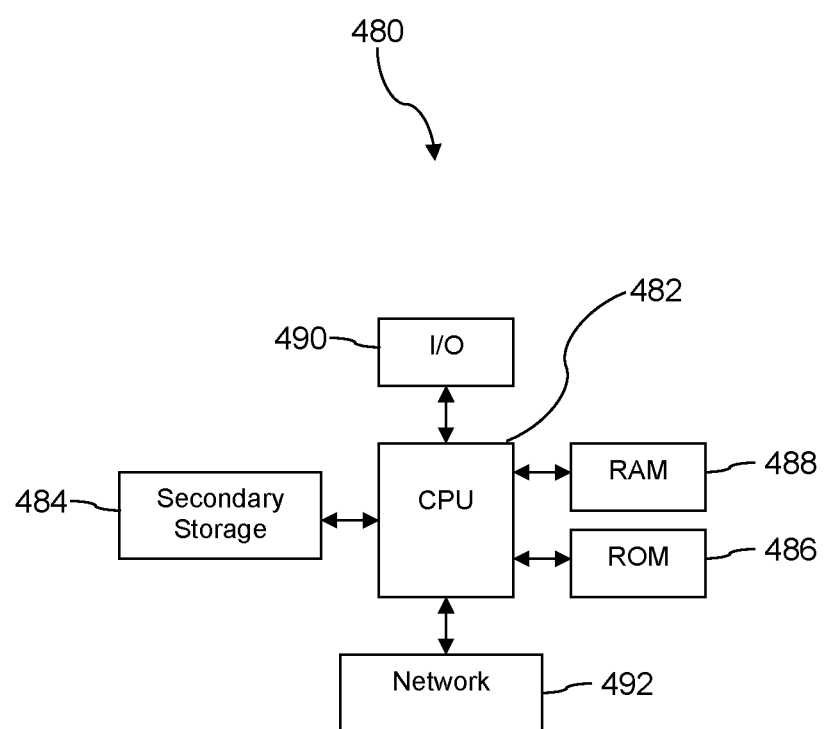
FIG. 9 is a block diagram of a computer system according to an embodiment of the disclosure.

FIG. 9 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 480 is turned on or booted, the CPU 482 may execute a computer program or application. For example, the CPU 482 may execute software or firmware stored in the ROM 486 or stored in the RAM 488. In some cases, on boot and/or when the application is initiated, the CPU 482 may copy the application or portions of the application from the secondary storage 484 to the RAM 488 or to memory space within the CPU 482 itself, and the CPU 482 may then execute instructions that the application is comprised of. In some cases, the CPU 482 may copy the application or portions of the application from memory accessed via the network connectivity devices 492 or via the I/O devices 490 to the RAM 488 or to memory space within the CPU 482, and the CPU 482 may then execute instructions that the application is comprised of. During execution, an application may load instructions into the CPU 482, for example load some of the instructions of the application into a cache of the CPU 482. In some contexts, an application that is executed may be said to configure the CPU 482 to do something, e.g., to configure the CPU 482 to perform the function or functions promoted by the subject application. When the CPU 482 is configured in this way by the application, the CPU 482 becomes a specific purpose computer or a specific purpose machine.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), flash drive, ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer system 480 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of mediating an encrypted communication channel via a user equipment (UE) relay, the method comprising:
   receiving, at a UE relay, an indication of a sensitive transaction from an application operating on a UE;
   establishing, by the UE relay, a downstream encrypted communication channel to the application via a communication port at the UE, wherein establishing the downstream encrypted communication channel comprises:
      transmitting, by the UE relay, a sensitive transaction instantiation message directing the UE to establish an operating environment for the sensitive transaction in a trusted security zone (TSZ); and
      receiving, by the UE relay, a request from the UE to establish the downstream encrypted communication channel to the TSZ at the UE;
   receiving, by the UE relay, an end point for the sensitive transaction from the application over the downstream encrypted communication channel; and
   creating, by the UE relay, an upstream encrypted communication channel to the end point.

2. The method of claim 1, wherein the indication of the sensitive transaction is a transaction request packet received by the UE relay from the UE based on an application programming interface (API) call from the application.

3. The method of claim 1, wherein the indication of the sensitive transaction is an encrypted packet received by the UE relay from the UE.

4. The method of claim 1, further comprising:
   maintaining, by the UE relay, the upstream encrypted communication channel and the downstream encrypted communication channel for a duration of the sensitive transaction; and
   tearing down, by the UE relay, the upstream encrypted communication channel and the downstream encrypted communication channel after a conclusion of the sensitive transaction.

5. The method of claim 1, wherein creating the upstream encrypted communication channel includes communicating with a network to access a network slice to act as part of a network tunnel between the UE and the end point.

6. The method of claim 1, wherein the downstream encrypted communication channel and the upstream encrypted communication channel secure the sensitive transaction from an application programming interface (API) of the application at the UE to an API of a destination application at the end point.

7. The method of claim 1, wherein the end point is not known to the UE relay until after establishing the downstream encrypted communication channel to the application.

8. A user equipment (UE) relay for mediating an encrypted communication channel comprising:
   a processor;
   a non-transitory memory; and
   a program stored in the non-transitory memory, that when executed by the processor causes the UE relay to:
      receive an indication of a sensitive transaction from an application operating on a UE;
      transmit a sensitive transaction instantiation message directing the UE to establish an operating environment for the sensitive transaction in a trusted security zone (TSZ);
      receive a request from the UE to establish a downstream encrypted communication channel to the TSZ at the UE;
      establish the downstream encrypted communication channel to the application via a communication port at the UE;
      receive an end point for the sensitive transaction from the application over the downstream encrypted communication channel; and
      create an upstream encrypted communication channel to the end point.

9. The UE relay of claim 8, wherein the program further causes the UE to record indications of the downstream encrypted communication channel, indications of the upstream encrypted communication channel, and indications of communications across the downstream encrypted communication channel and the upstream encrypted communication channel in a blockchain for verification of the sensitive transaction.

10. A method of mediating an encrypted communication channel via a user equipment (UE) relay, the method comprising:
   receiving, at a UE relay, an indication of a sensitive transaction from an application operating on a UE;
   establishing, by the UE relay, a downstream encrypted communication channel to the application via a communication port at the UE;
   generating, at the UE relay, a genesis block of a blockchain for recording the sensitive transaction;
   transmitting, by the UE relay, the genesis block to the application;
   receiving, at the UE relay, a blockchain from the application at the UE over the downstream encrypted communication channel, wherein the blockchain includes the genesis block and one or more life blocks indicating the application and an end point for the sensitive transaction; and
   creating, by the UE relay, an upstream encrypted communication channel to the end point, wherein the upstream encrypted communication channel is created based on the blockchain.

11. The method of claim 10, further comprising transmitting, by the UE relay, the blockchain to the end point.

12. The method of claim 11, wherein the upstream encrypted communication channel is employed to communicate the blockchain between the UE relay and the end point.

13. The method of claim 10, wherein the downstream encrypted communication channel is employed to communicate the genesis block and the blockchain between the UE relay and the application.

14. The method of claim 10, further comprising:
   receiving, at the UE relay, event blocks indicating events in the sensitive transaction; and
   storing the event blocks as part of the blockchain.

15. The method of claim 10, wherein the encrypted communication channel operates over a single use network tunnel between the UE and the end point, and wherein the blockchain is stored to act as verification of events occurring over the single use network tunnel.

16. The method of claim 10, wherein establishing the encrypted communication channel includes communicating with a network to access a network slice to act as part of a network tunnel between the UE and the end point.

17. The method of claim 10, further comprising transmitting, by the UE relay, a sensitive transaction instantiation message directing the UE to establish an operating environment for the sensitive transaction in a trusted security zone (TSZ), wherein the genesis block is transmitted to the application in the TSZ and wherein the blockchain is received from the application in the TSZ.

18. The method of claim 17, wherein the upstream encrypted communication channel extends from the TSZ at the UE to the end point via the UE relay.

\* \* \* \* \*